United States Patent [19]

Gwyn

[11] 4,450,400

[45] May 22, 1984

[54] BATTERY REPLACEMENT SYSTEM FOR ELECTRIC VEHICLES

[76] Inventor: Marion V. Gwyn, 8035 Coolidge, Center Line, Macomb, Mich. 48015

[21] Appl. No.: 327,318

[22] Filed: Dec. 4, 1981

[51] Int. Cl.³ .............................................. B60K 1/04
[52] U.S. Cl. .......................................... 320/2; 104/34; 320/15; 414/278; 414/281; 414/373; 414/659
[58] Field of Search ............... 414/278, 281, 373, 390, 414/395, 398, 659; 104/34; 320/2, 15; 180/68.5

[56] References Cited

U.S. PATENT DOCUMENTS

| 668,109 | 2/1901 | Mailloux | 104/34 |
| 1,575,699 | 3/1926 | Mancha | 104/34 |
| 3,921,828 | 11/1975 | Suizu | 414/281 X |
| 4,334,819 | 6/1982 | Hammerslag | 104/34 X |

FOREIGN PATENT DOCUMENTS 2236215  5/1973  Fed. Rep. of Germany ........ 104/34

Primary Examiner—Robert G. Sheridan
Attorney, Agent, or Firm—Peter A. Taucher; John E. McRae; Robert P. Gibson

[57] ABSTRACT

A system for replacing electrical batteries in electrically powered vehicles in a minimum period of time on the order of one minute or less. Carriage-elevator structure is arranged in front of a battery charging station to transfer selected batteries between the charging station and a parked stationary vehicle. The vehicle and the charging station are provided with roller support units adapted to bear the battery weight and permit manual push-and/or pull shift of individual batteries to or from the aforementioned elevator. The system enables a substantially discharged battery to be removed from a vehicle and replaced with a fully charged battery in a very short time, e.g. about one minute.

4 Claims, 5 Drawing Figures

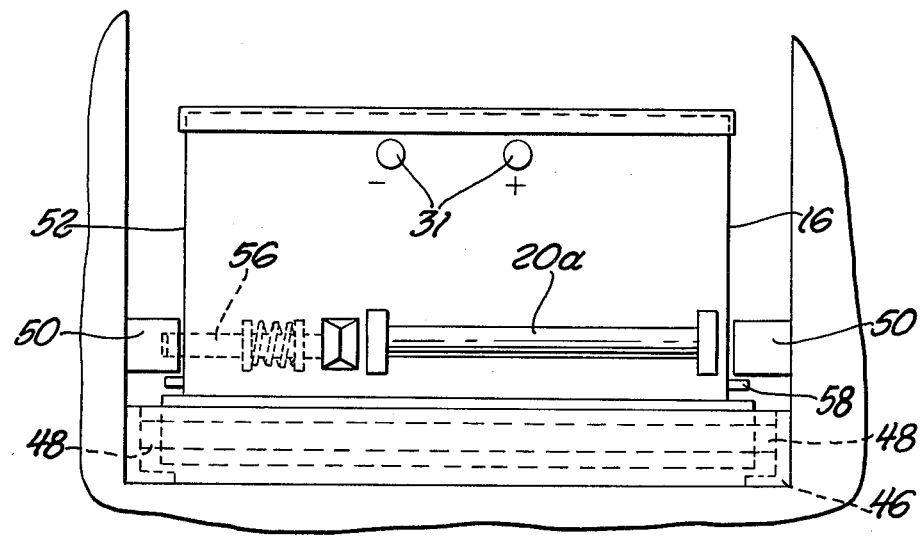
Fig. 3
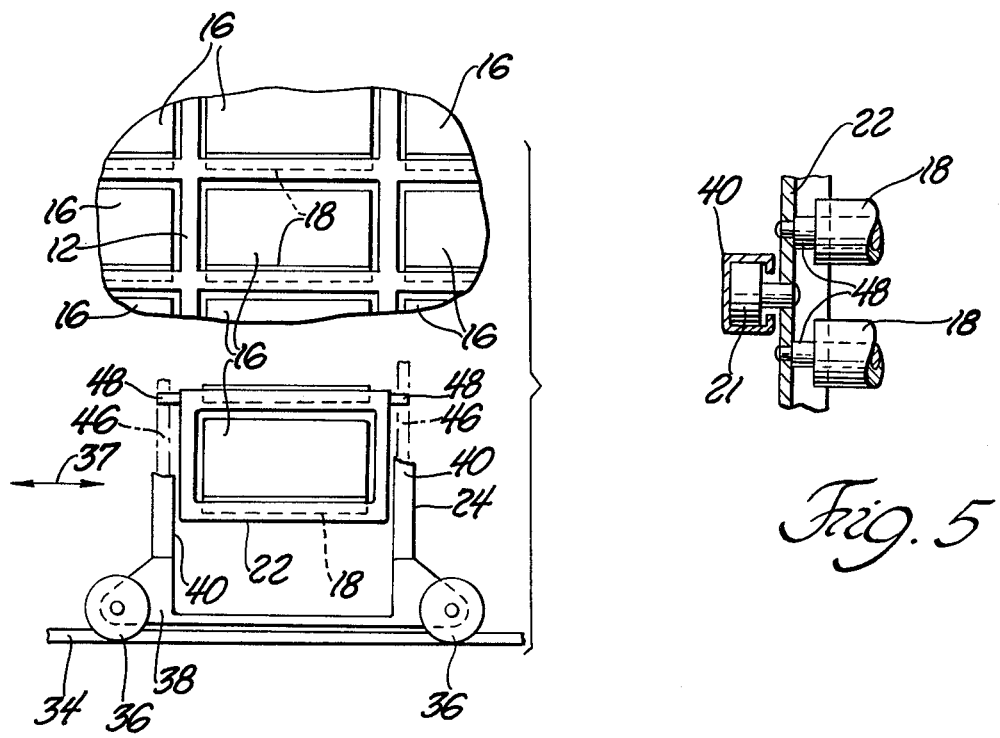
Fig. 4
Fig. 5

BATTERY REPLACEMENT SYSTEM FOR ELECTRIC VEHICLES

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to mechanism for replacing batteries in electrically powered vehicles. A particular aim of the invention is to minimize the "out of service" time while batteries are being recharged. I contemplate that the batteries for any given vehicle will be located within a tray or box that can be manually transferred to or from the vehicle in a relatively short time span, e.g., less than one minute. This battery-box assembly is sometimes referenced herein as a "battery module."

Under my concept individual battery modules are provided with sets of external terminals adapted to automatically plug onto electrical receptacles in a vehicle when the battery module is transferred into the vehicle. The aim is to accomplish electrical hook-up as part of the battery moduleloading operation, thereby saving some time and also permitting the operation to be performed by persons unskilled in the electrical battery field.

The entire system preferably includes a battery charging station that includes a number of horizontal roller support units for individual battery modules. In one contemplated arrangement the charging station includes twelve vertical rows of roller support units arranged in side-by-side relation. Each vertical row includes seven roller support units; accordingly in this instance the charging station can accommodate eighty-four battery modules. Each roller unit in the charging station may be equipped with an electrical receptacle electrically connected to a central battery charger. Each battery module includes a second set of terminals that automatically plug in to the receptacle in the charging station when that module is delivered onto an individual roller support unit. The aim is to effect automatic hook-up of the battery to the charger as part of the operation of moving the battery module into the station.

Transfer of individual battery modules between the battery charging station and a vehicle is preferably accomplished by a transfer mechanism that can be shifted horizontally into registry with different rows of roller support units in the charging station. The transfer mechanism includes an elevator that can be moved vertically to register with any one roller support unit in the charging station. By shifting the transfer mechanism horizontally and operating the elevator vertically it is possible to gain access to any roller support unit in the charging station. The transfer mechanism can be shifted into a position registering with a roller support unit in a vehicle when the vehicle is in a prespecified location adjacent to the charging station. A partially discharged battery module in the vehicle can be shifted onto the elevator in the transfer mechanism, after which a different fully charged battery module can be delivered from the elevator into the vehicle.

The contemplated system is intended to achieve a relatively quick battery module replacement operation in a vehicle, e.g., within one minute or less. The preferred system includes electrical motors or other power devices for moving the relatively heavy battery modules in the vertical direction. Roller type conveyor units are utilized to permit manual shift of the battery modules in horizontal directions. An aim of the invention is to provide a minimum number of electric motor power assist devices for achieving a relatively low cost system that can be operated by relatively unskilled personnel.

Another aim of the invention is to provide a system that can be designed to charge a relatively large number of battery modules, thereby enabling the service facility to handle a large number of vehicles in any given eight hour period (or other time period required to recharge a battery module).

THE DRAWINGS

FIG. 3 is a left end elevational view of the FIG. 2 structure.

FIG. 4 is a fragmentary front elevational view of the FIG. 1 facility.

FIG. 5 is a fragmentary sectional view showing a structural detail of an elevator guide means used in the FIG. 1 facility.

Figure 1:
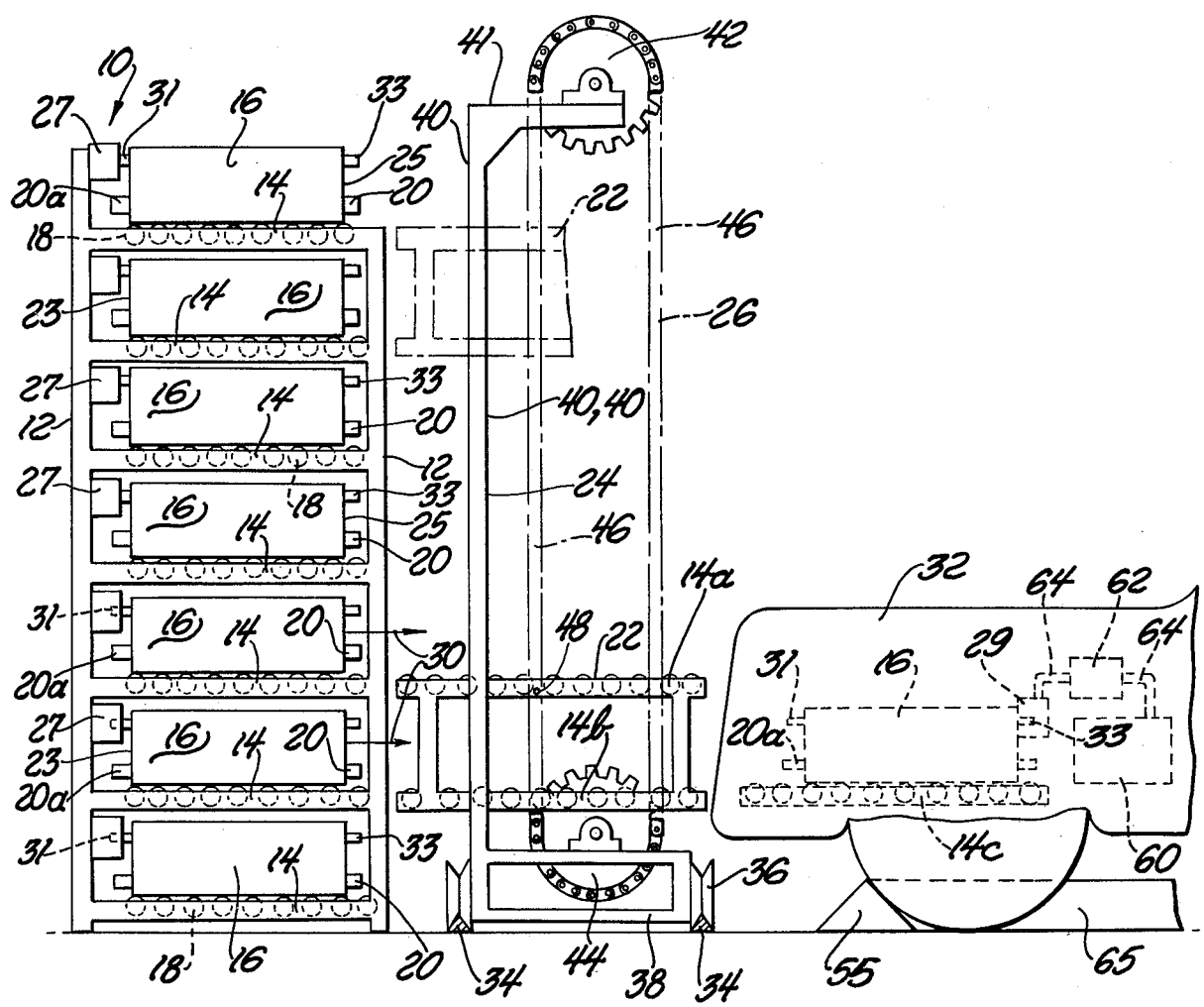
FIG. 1 is a side elevational view of a service facility embodying my invention.

Referring in greater detail to FIG. 1, there is shown a battery charging station 10 that includes an upright framework 12 for supporting a plurality of horizontal roller support units 14. FIG. 1 shows one vertical row of seven roller support units 14 arranged one above another for supporting individual rectangular battery modules 16. FIG. 4, taken at right angles to FIG. 1, shows the side-to-side orientation of the vertical rows of roller support units; a given system might include ten or more vertical rows of module support units in accordance with available space and financial constraints.

Each support unit 14 includes a number of rollers 18 adapted to rollably engage the undersurface of an associate battery module for supporting same in a fixed position in the charging station. The rollers rotate on their individual axes but do not move out of the charging station. FIG. 1 shows nine rollers in each support unit but this is not critical; the number of rollers is determined largely by the size and weight of the battery module. In a typical situation the battery module might weigh in the neighborhood of five hundred to eight hundred pounds, depending on power-range requirements of the vehicle and future weight reduction advances in battery design. A typical module might have a height of about ten inches, a width of about twenty-eight inches, and a length of about forty inches.

Each battery module 16 includes a rectangular box or tray for containment of the individual batteries. The opposite end walls 23 and 25 of the battery box have sets of pin-like terminals 31 and 33 extending therefrom for plug-in connection to electrical receptacles 27 and 29 mounted, respectively, in charging station 10 and vehicle 32. Each receptacle 27 is electrically connected to a battery charger, not shown in FIG. 1, whereby the individual modules 16 are recharged during the time when they are located in station 10.

The right end wall of each battery box has a handle 20 thereon for enabling an attendant to draw the module outwardly from charging unit 10 onto an elevator 22 that forms part of a transfer mechanism 24. In FIG. 1 elevator 22 is shown in a lowered position (full lines) and also in a raised position (dashed lines). A powered chain-sprocket system 26 is arranged in the transfer mechanism for moving elevator 22 upwardly or downwardly to selected positions in registry with different ones of the roller support units 14 in station 10. A manual pull-out action on handle 20 of the selected module 16 causes the module to be drawn rightwardly onto elevator 22, as shown by arrow 30. The illustrated elevator includes two roller support units 14a and 14b, although only one such unit is essential for operation of the system. Use of two roller support units is advantageous in enabling battery replacement in vehicle 32 without need for shifting or moving the transfer mechanism 24 along the stationary support tracks 34.

Tracks 34 extend along the front face of charging station 10 for enabling transfer mechanism 24 to register with different ones of the vertical rows of battery modules in charging station 10. Wheels 36 facilitate manual motion of the transfer mechanism in the arrow 37 directions; in a more elaborate, but more expensive system one or all of wheels 36 could be powered to achieve the arrow 37 movement without human assistance.

Transfer mechanism 24 includes a carriage 38 that defines two upstanding rails 40; as seen in FIG. 5, each rail 40 has a channel cross-section for coaction with guide rollers 21 on elevator 22 to thus confine the elevator to movement in the vertical direction. A reversible electrical motor may be arranged on a platform 41 at the upper ends of rails 40 to drive two sprockets, one of which is shown at 42 in FIG. 1. Two idler sprockets 44 are located below the drive sprockets to guide endless chains 46 on preestablished paths. Each chain 46 has a connection 48 with a side area of elevator 22, whereby operation of the electric motor produces vertical movement of the elevator. The carriage-elevator mechanism must be designed to provide a central vertical free area enabling battery modules 16 to be moved between elevator 22 and any selected roller support unit 14 in station 10.

Each vehicle 32 is equipped with a roller support unit 14c that is generally similar to units 14 in charging station 10 and units 14a, 14b in elevator 22. The roller support unit shown in FIGS. 2 and 3 comprises a rectangular frame 46 suitably affixed to interior surfaces of the vehicle. Each hollow roller 18 may be freely supported on a transverse shaft or rod 48, whereby the roller can shift slightly along the shaft axis when necessary to achieve precise alignments of pins 33 and the openings in receptacle 29. Stationary rub-rails 50 may be provided with curved outer ends 53 to camingly guide battery box 52 into a desired centered position. Rub-rails 50 also prevent any undesired side play of box 52 while the vehicle is in motion.

The battery box and its contents are prevented from inadvertent movement in a longitudinal direction by a stationary stop 54 near the right end of frame 46 and a manually-actuable latch 56 on the box left end wall 23. Undesired upward dislocation of the battery box may be prevented by means of fingers 58 that project from the box side walls into the space beneath rub-rails 50.

Figure 2:
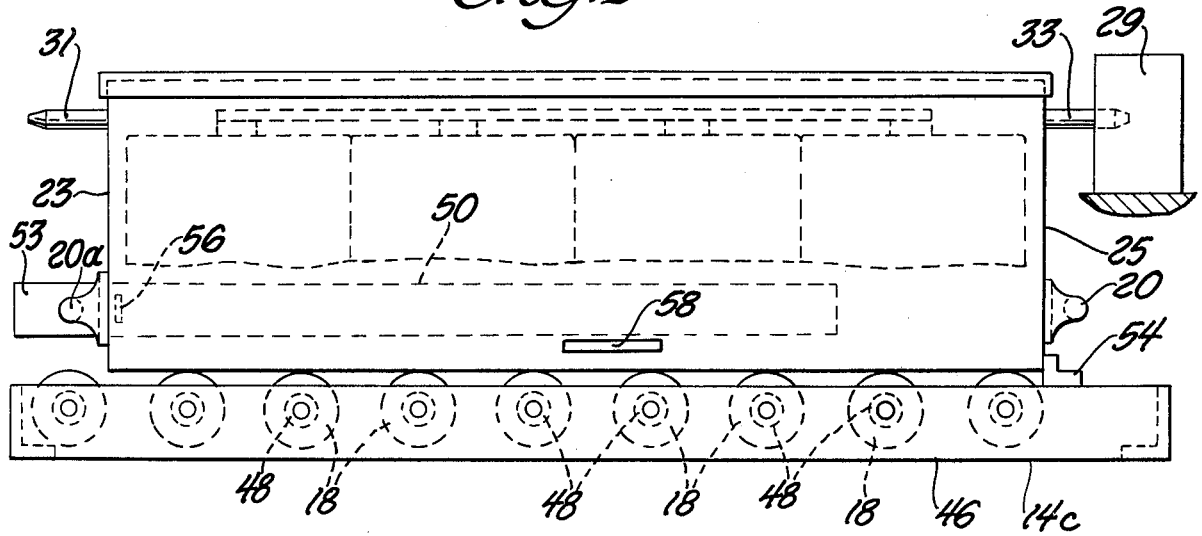
FIG. 2 is an enlarged side elevational view of a roller support unit and battery module used in the FIG. 1 facility.

The present invention can be used with different electrical vehicle designs incorporating a range of different electrical propulsion systems, e.g., hybrid electrical-gasoline engine systems or electrical-only systems. FIG. 2 illustrates the vehicle electrical system as including a propulsion motor 60 and controller 62 electrically conected to receptacle 29 by wiring 64.

In operation of the battery replacement system the vehicle is driven forwardly between guides 65 to its illustrated position engaged with a stop element 55. The vehicle hood is opened and handle 20a is grasped to pull the discharged battery module leftwardly from roller support unit 14c onto roller support unit 14b in elevator 22. Elevator 22 may then be lowered a slight amount to put roller support unit 14a into the position previously occupied by unit 14b. Assuming that a charged battery module 16 is already on roller support unit 14a, that module can be manually pushed onto roller support unit 14c. When the module reaches stop 54 electrical pins 33 will extend a sufficient distance into receptacle 29 to make the necessary electrical connections with the vehicle propulsion system. Latch 56 prevents undesired reverse motion of the battery module. The receptacle-pin positions could be transposed, i.e., receptacle 29 could be positioned on the battery box and pins 33 in the vehicle if so desired.

The discharged battery module on roller support unit 14b can be transferred into an unoccupied space in charging station 10 by manipulating carriage 38 and elevator 22 to the appropriate position wherein unit 14b registers with the unoccupied space. After the discharged battery module has been sent back to station 10 a fully charged battery module can be moved from station 10 onto roller support unit 14a or 14b. The elevator and carriage 38 can be manipulated back to a preestablished position ready for the next vehicle.

FIGS. 2 and 3 show certain structural features for achieving precise positionment of module 16 in the vehicle. Similar structural features can be used in battery charging station 10 to achieve a desired battery module positioning.

As previously noted, elevator 22 could be provided with only one roller support unit. However, in that event a battery replacement operation would require that the discharged battery module be transferred into station 10 before movement of the replacement module into the vehicle. The use of two or more roller support units in the elevator somewhat shortens the time required to complete one battery module replacement operation.

The drawings show an arrangement wherein the vehicle roller support unit 14c is oriented so that individual rollers have their rotational axes extending transversely to the vehicle longitudinal axis, whereby the battery module is moved along the vehicle longitudinal axis during the battery replacement operation. However, my invention can also be embodied in a so-called "side loader" arrangement wherein the module movement would be transverse to the vehicle longitudinal axis.

I wish it to be understood that I do not desire to be limited to the exact details of construction shown and described for obvious modifications will occur to a person skilled in the art.

I claim:

1. In association with battery-powered vehicles, the combination comprising an upright battery charging station that includes first horizontal roller support units constructed to receive battery modules for charging purposes; said support units being arranged in vertical rows, adjacent ones of the rows being in side-by-side relationship; an upright battery module transfer mechanism movable horizontally along one face of the battery charging station for selective registration with different ones of the vertical rows of horizontal roller support units in said station; an elevator carried by the transfer mechanism for selective registration with different ones of the battery modules in any given vertical row; said elevator including a second roller support unit for supporting at least one battery module thereon; and a third battery module roller support unit located within an automobile for registration with a module roller support unit on the elevator after the vehicle has been driven to a prespecified location near the path traversed by the aforementioned transfer mechanism; each battery module support unit comprising a number of horizontal rollers adapted to rollably engage the undersurface of a battery module; the various module roller support units being sufficiently close to one another when the vehicle is in the prespecified location that a given battery module can be moved horizontally from the third roller support unit to a second roller support unit and thence onto selected ones of the first roller support units; each battery module comprising a rectangular box and a plurality of batteries disposed therein; two sets of external terminals on opposite ends of the box, and electrical connections between said batteries and said external terminals; said charging station including a first electrical receptacle located above each one of the first roller support units for electrical engagement by one set of terminals on a battery box when the box is moved to its intended position in the charging station; and a second electrical receptacle located above the third roller support unit in the vehicle for electrical engagement by the other set of terminals on the battery box when the box is moved to its intended position in the vehicle.

2. In association with battery-powered vehicles, the combination comprising an upright battery charging station that includes first horizontal roller support units constructed to receive battery modules for charging purposes; said support units being arranged in vertical rows, adjacent one of the rows being in side-by-side relationship; an upright battery module transfer mechanism movable horizontally along one face of the battery charging station for selective registration with different ones of the vertical rows of horizontal roller support units in said station; an elevator carried by the transfer mechanism for selective registration with different ones of the battery modules in any given veritcal row; said elevator including a second roller support unit for supporting at least one battery module thereon; and a third battery module roller support unit located within an automobile for registration with a module roller support unit on the elevator after the vehicle has been driven to a prespecified location near the path traversed by the aforementioned transfer mechanism; each battery module support comprising a number of horizontal rollers adapted to rollably engage the undersurface of a battery module for horizontal motion therealong; the various module roller support units being sufficiently close to one another when the vehicle is in the prespecified location that a given battery module can be moved horizontally from the third roller support unit to a second roller support unit on the elevator and thence onto selected ones of the first roller support units in the charging station; the second roller support unit being constructed so that battery modules are movable horizontally in two directions, whereby said transfer mechanism can be used not only for transferring battery modules from the vehicle to the charging station but also for transferring battery modules from the charging station back to the vehicle; said transfer mechanism being the only transfer mechanism in the transfer path between the vehicle and charging station.

3. The combination of claim 2: said second roller support unit including two individual roller sub units, one below the other; the vertical spacing of said two roller sub units corresponding to the vertical spacing of the roller support units in the battery charging station whereby one battery module can be transferred from the elevator to the charging station and another battery module transferred from the charging station to the elevator without moving the elevator; the elevator being constructed so that a battery module within the vehicle can be replaced without shifting the transfer mechanism from its position registering with the vehicle.

4. The combination of claim 2: said transfer mechanism including an upright carriage having support wheels at its lower end movable on tracks extending along the aforementioned face of the charging station; said carriage including two vertical guide rails located on opposite side surfaces of the elevator whereby said elevator occupies the space circumscribed by the rails, said elevator having guide rollers engaged on said vertical guide rails for confining the elevator to vertical motions on the carriage.

* * * * *